United States Patent
Yoshizawa et al.

(10) Patent No.: US 9,132,778 B2
(45) Date of Patent: Sep. 15, 2015

(54) LUGGAGE BOARD MOVEMENT MECHANISM

(71) Applicants: Nissan Motor Co., Ltd., Kanagawa (JP); Kasai Kogyo Co., Ltd., Kanagawa (JP)

(72) Inventors: Shoichi Yoshizawa, Tokyo (JP); Atsushi Akiba, Kanagawa (JP); Masatoshi Yamashita, Kanagawa (JP); Shigehiro Okada, Kanagawa (JP)

(73) Assignees: Nissan Motor Co., Ltd., Kanagawa (JP); Kasai Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 14/379,214

(22) PCT Filed: Feb. 14, 2013

(86) PCT No.: PCT/JP2013/053448
§ 371 (c)(1),
(2) Date: Aug. 15, 2014

(87) PCT Pub. No.: WO2013/122120
PCT Pub. Date: Aug. 22, 2013

(65) Prior Publication Data
US 2015/0054299 A1 Feb. 26, 2015

(30) Foreign Application Priority Data
Feb. 17, 2012 (JP) .................. 2012-032929

(51) Int. Cl.
*B60R 7/04* (2006.01)
*B60R 5/04* (2006.01)
*B60R 13/01* (2006.01)

(52) U.S. Cl.
CPC . *B60R 5/045* (2013.01); *B60R 5/04* (2013.01); *B60R 13/013* (2013.01)

(58) Field of Classification Search
CPC .......... B60R 5/045; B60R 5/04; B60R 13/013
See application file for complete search history.

(56) References Cited

U.S. PATENT DOCUMENTS 7,052,063 B2 * 5/2006 Haspel et al. ............. 296/24.43

FOREIGN PATENT DOCUMENTS

FR 2921314 A1 3/2009
JP 2008-273331 A 11/2008
(Continued)

OTHER PUBLICATIONS

Extended European Search Report issued in corresponding European Application No. 13749677.4, mailed on Feb. 5, 2015 (6 pages).
(Continued)

*Primary Examiner* — Lori L Lyjak
(74) *Attorney, Agent, or Firm* — Osha Liang LLP (57) ABSTRACT

A movement mechanism of a luggage board for dividing a vehicle luggage compartment into upper and lower parts. Sidewalls on either side of the luggage compartment are each provided with a guide part for guiding guide protrusions when a luggage board moves between the upper and lower positions and a support part for supporting the luggage board. The guide part has a lower guide section inclined such that a vehicle rear side thereof is positioned above a vehicle front side thereof and an upper guide section extending toward the front of the vehicle from the end of the lower guide section on the vehicle rear side. The support part is provided on each sidewall of the luggage compartment more toward the rear of the vehicle than an intersection part between the lower guide section and the upper guide section on the vehicle rear side.

8 Claims, 5 Drawing Sheets (56) References Cited

FOREIGN PATENT DOCUMENTS

| JP | 2009-040250 A | 2/2009 |
| JP | 2010-000991 A | 1/2010 |
| JP | 2010-269792 A | 12/2010 |
| JP | 2011-116190 A | 6/2011 |

OTHER PUBLICATIONS

International Search Report issued in PCT/JP2013/053448 mailed on May 21, 2013 (2 pages).
Written Opinion of the International Searching Authority issued in PCT/JP2013/053448 mailed on May 21, 2013 (4 pages).
International Preliminary Report on Patentability from PCT/JP2013/053448 issued on May 27, 2013 (7 pages).

* cited by examiner

LUGGAGE BOARD MOVEMENT MECHANISM

TECHNICAL FIELD

The present invention relates to a movement mechanism for a luggage board to be installed in a luggage compartment of a vehicle.

BACKGROUND ART

Japanese Patent Application Publication No. 2010-991 discloses a movement mechanism for a luggage board configured to divide a vehicle luggage compartment into upper and lower parts. This movement mechanism can change the position of a luggage board between an upper position where the luggage board divides the luggage compartment into the upper and lower parts and a lower position where the luggage board is placed at the bottom of the luggage compartment, by moving guide protrusions along guide grooves provided in left and right sidewalls of the luggage compartment, the guide protrusions being provided on both edges of the luggage board.

Each of the guide grooves includes: an inclined groove inclined such that its lower section is positioned on the vehicle front side and its upper section is positioned on the vehicle rear side; and a horizontal groove continuous with an upper end of the inclined groove. Also, a valve member is provided, which can move into and out of an intersection part between the inclined groove and the horizontal groove. The valve member is pushed by the guide protrusions to be retracted from the state of protruding into the guide groove, when the guide protrusions move upward through the inclined groove during positional shift of the luggage board from the lower position to the upper position. Moreover, the valve member is pushed by the guide protrusions when the guide protrusions move forward through the horizontal groove, and protrude into the guide groove to serve as a bridge over the inclined groove.

SUMMARY OF INVENTION

Technical Problem

However, the above movement mechanism includes a movable mechanism that requires a biasing member such as a spring to allow the valve member to move into and out of the guide groove. Such a configuration complicates the structure and increases the number of parts.

It is an object of the present invention to provide a movement mechanism for a luggage board capable of dividing a vehicle luggage compartment into upper and lower parts, the movement mechanism having a more simplified structure and allowing the luggage board to be shifted between upper and lower positions with a simple operation.

Solution to Problem

An aspect of the present invention is a luggage board movement mechanism including a guide part and a support part provided on each of sidewalls positioned on either side of a luggage compartment in a vehicle width direction, the guide part guiding guide protrusions when a luggage board moves between an upper position and a lower position and the support part supporting the luggage board. The guide part includes a lower guide section inclined such that a vehicle rear side thereof is positioned above a vehicle front side thereof, and an upper guide section extending toward the front of the vehicle from the end of the lower guide section on the vehicle rear side. The support part is provided on each sidewall of the luggage compartment more toward the rear of the vehicle than an intersection part between the lower guide section and the upper guide section on the vehicle rear side.

DESCRIPTION OF EMBODIMENTS

An embodiment of the present invention is described below with reference to the drawings.

Figure 2:
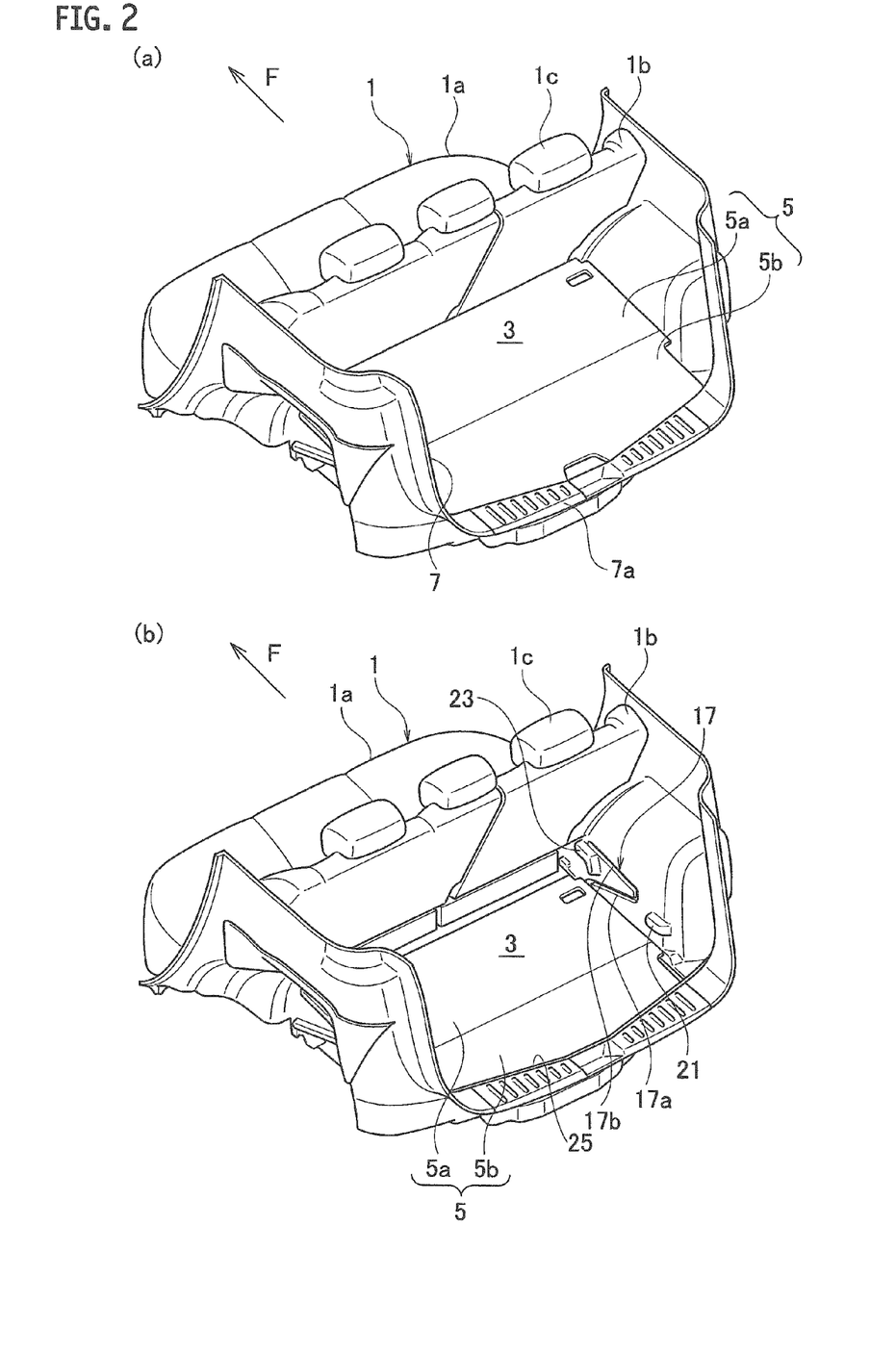
FIG. 2 is perspective views of the inside of the luggage compartment, seen from a diagonally left rear side of the vehicle, of the vehicle including the luggage board movement mechanism, Part (a) of FIG. 2 showing a state where the luggage board is in an upper position and Part (b) of FIG. 2 showing a state where the luggage board is in a lower position.

As shown in FIG. 2, a luggage compartment 3 is provided at a vehicle rear side of a rear seat 1 in a vehicle. A luggage board 5 is disposed at the bottom of the luggage compartment 3. A rear opening 7 is formed on the vehicle rear side of the luggage compartment 3 opposite to the rear seat 1. In the rear opening 7, an unillustrated back door is openably and closably provided. Note that a direction indicated by an arrow F in FIG. 2 is the front of the vehicle.

Figure 1:
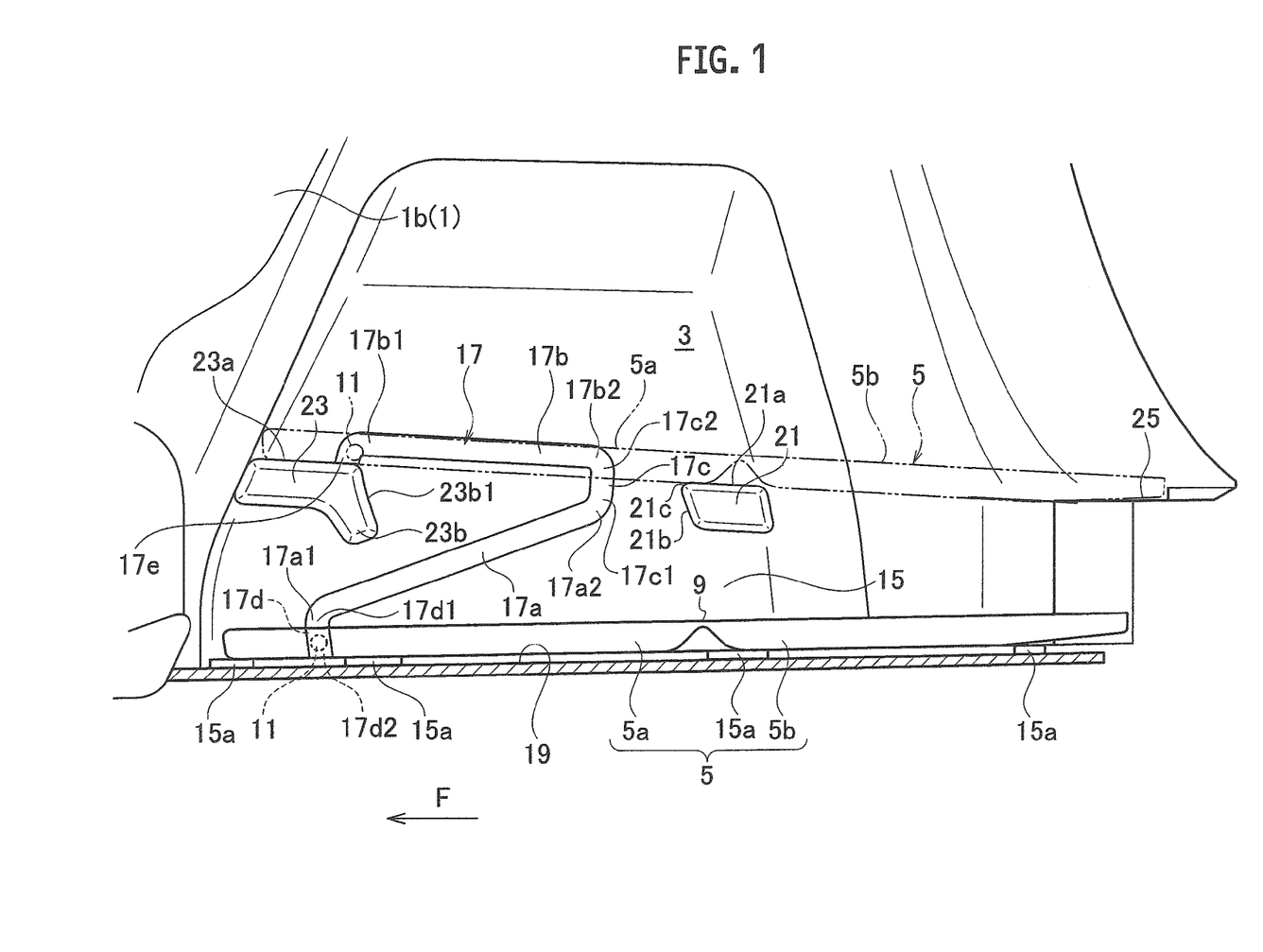
FIG. 1 is a side view of a luggage compartment sidewall, seen from inside of a luggage compartment, of a vehicle including a luggage board movement mechanism according to an embodiment of the present invention.

The luggage board 5 can move between an upper position shown in Part (a) of FIG. 2 and a lower position shown in Part (b) of FIG. 2. When located at the upper position, the luggage board 5 divides the luggage compartment 3 into an upper space above the luggage board 5 and a lower space below the luggage board 5, as shown in FIG. 1 and Part (a) of FIG. 2. An upper surface of the luggage board 5 in the upper position is approximately on the same plane as an upper surface of a lower end 7*a* of the rear opening 7. This allows luggage to be easily taken in and out on the luggage board 5.

The rear seat 1 includes a seat cushion 1*a*, a seat back 1*b* and a head rest 1*c*. The luggage compartment 3 can be extended up to a space above the rear seat 1 by folding the seat back 1*b* forward. The back surface (upper surface) of the seat back 1*b* in a forward-folded state is approximately on the same plane as the upper surface of the luggage board 5 in the upper position. This allows luggage to be easily taken in and out on the seat back lb in the forward-folded state.

Figure 3:
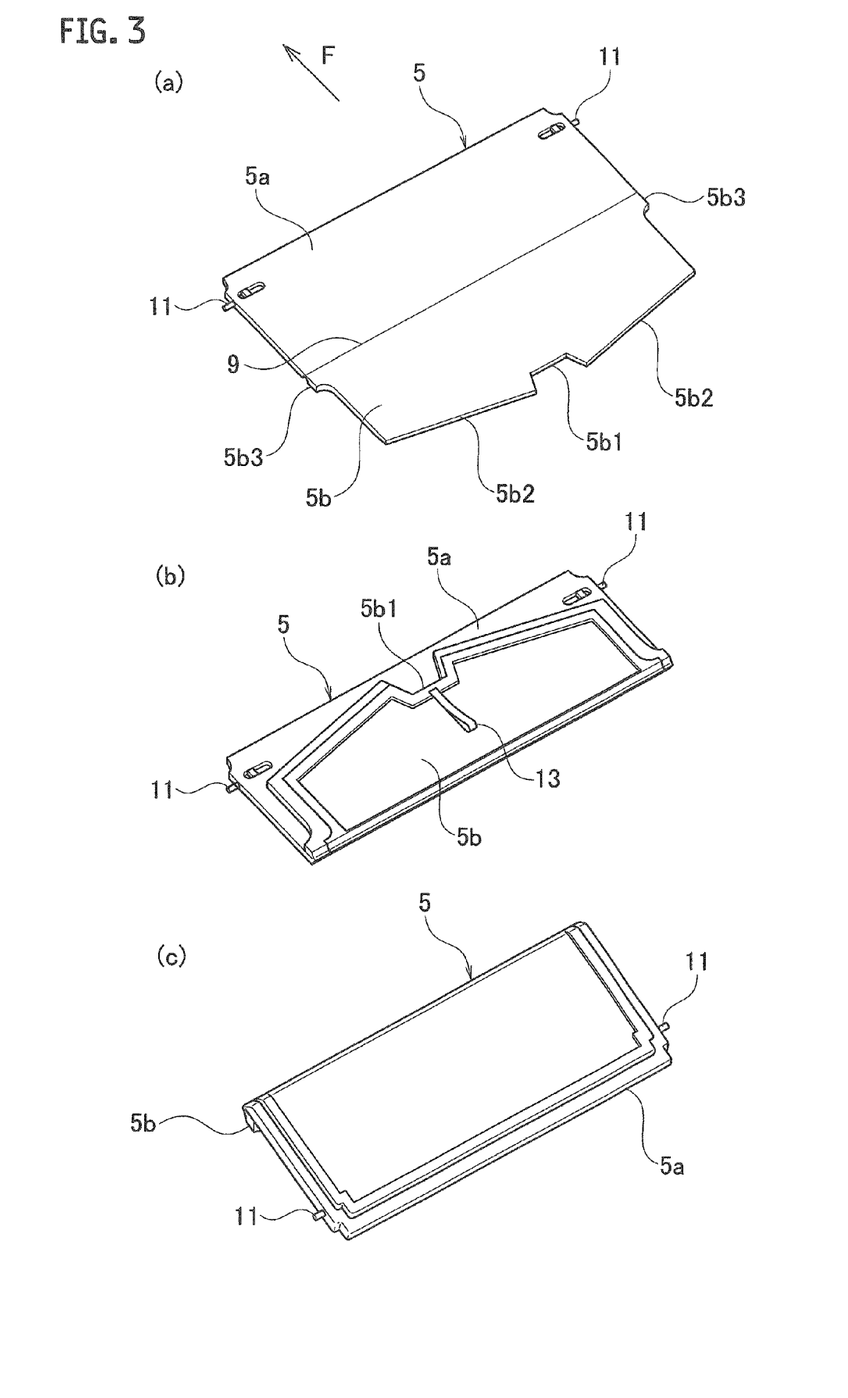
FIG. 3 is perspective views of the luggage board, Part (a) of FIG. 3 showing the luggage board in an open state, Part (b) of FIG. 3 showing the luggage board in a folded state, and Part (c) of FIG. 3 showing the luggage board in the folded state shown in Part (b) of FIG. 3 from the rear.

The luggage board 5 has a structure that can be folded in half in a vehicle longitudinal direction as shown in FIG. 3. More specifically, as shown in FIG. 2, the luggage board 5 includes: a front board 5*a* positioned on the vehicle front side in a state of being set in the vehicle luggage compartment 3; and a rear board 5*b* positioned more toward the vehicle rear side than the front board 5*a*. Between the boards 5*a* and 5*b*, a hinge 9 is provided, which turnably connects the two boards 5*a* and 5*b*.

The hinge 9 enables the luggage board 5 to be changed between an open state, i.e., a state where the surfaces of the front and rear boards 5*a* and 5*b* form the same plane (flat surface) as shown in Part (a) of FIG. 3 and a folded state, i.e., a state where the rear board 5*b* is placed on the front board 5*a* as shown in Part (b) of FIG. 3. The length of the luggage board 5 in the folded state in the vehicle longitudinal direction is approximately half the length thereof in the open state in the vehicle longitudinal direction. The rear board 5*b* is formed such that a length thereof in the vehicle longitudinal direction is slightly shorter than that of the front board 5*a*.

The front board 5*a* has a rectangular shape that is long in a vehicle width direction. On both side edges of the front board 5*a* in the vehicle width direction on the vehicle front side, guide pins 11 are provided, which are guide protrusions protruding laterally (outward) in the vehicle width direction from the both side edges. Meanwhile, a concave section 5*b*1 is formed in the center in the vehicle width direction of an edge of the rear board 5*b*, in the open state shown in Part (a) of FIG. 3, on the vehicle rear side opposite to the front board 5*a*. To fold the luggage board 5, a user grasps a rear end of the rear board 5*b* by putting his/her hand into the opening formed by the concave section 5*b*1 and then folds the rear board 5*b* forward.

The edge of the rear board 5*b* on the vehicle rear side includes tapered sections 5*b*2 extending laterally (outward) in the vehicle width direction from the concave section 5*b*1. In the rear board. 5*b* in the open state shown in Part (a) of FIG. 3, the tapered sections 5*b*2 are angled such that the outer side in the vehicle width direction is positioned closer to the vehicle front side. Moreover, the rear board 5*b* is formed such that the length thereof in the vehicle width direction, except for the end on the front board 5*a* side, is slightly shorter than that of the front board 5*a* in the vehicle width direction. At the end on the front board 5*a* side, the length of the rear board 5*b* in the vehicle width direction is approximately the same as that of the front board 5*a* in the vehicle width direction. Thus, protrusions 5*b*3 protruding outward in the vehicle width direction are formed at the end of the rear board 5*b* on the front board 5*a* side.

Also, as shown in Part (b) of FIG. 3, a strap 13 as a grasping portion is attached near the concave section 5*b*1 on the rear surface of the rear board 5*b*. The user grasps the strap 13 for the work to change the luggage board 5 from the folded state shown in Part (b) of FIG. 3 to the open state shown in Part (a) of FIG. 3.

Next, description is given of a shape of left and right sidewalls of the luggage compartment 3, which support the luggage board 5. Note that FIG. 1 shows a sidewall 15 on the right side of the vehicle in the luggage compartment 3. However, since the sidewalls 15 are symmetrical on the right and left sides of the vehicle, only the sidewall 15 on the right side is described.

In the sidewall 15, a guide groove 17 is formed as a guide part to guide the guide pins 11 on the luggage board 5. The guide groove 17 mainly includes: an inclined groove 17*a* as a lower guide section positioned near a bottom surface 19 of the luggage compartment 3; and a horizontal groove 17*b* as an upper guide section positioned above the inclined groove 17*a*. The guide pins 11 are inserted into the guide groove 17 and movable along the guide groove 17 while keeping the inserted state.

The inclined groove 17*a* is inclined such that a front end 17*a*1 on the seat back 1*b* side at the vehicle front is positioned near the bottom surface 19 of the luggage compartment 3 and a rear end 17*a*2 on the vehicle rear side is positioned above the front end 17*a*1. In the horizontal groove 17*b*, a front end 17*b*1 on the vehicle front side is positioned slightly above a rear end 17*b*2 on the vehicle rear side. However, the two ends are positioned approximately at the same level.

The rear end 17*a*2 of the inclined groove 17*a* and the rear end 17*b*2 of the horizontal groove 17*b* are approximately at the same position in the vehicle longitudinal direction. Also, the rear end 17*a*2 and the rear end 17*b*2 are formed to be continuous with each other through an upper vertical groove 17*c* as an upper communicating section. More specifically, the rear end 17*a*2 of the inclined groove 17*a* is continuous with (smoothly connected to) a lower end 17*c*1 of the upper vertical groove 17*c*, and the rear end 17*b*2 of the horizontal groove 17*b* is continuous with (smoothly connected to) an upper end 17*c*2 of the upper vertical groove 17*c*.

Moreover, a lower vertical groove 17*d* as a vertically extending lower end guide section is continuous with (smoothly connected to) the front end 17*a*1 of the inclined groove 17*a*. The lower vertical groove 17*d* is inclined such that an upper end 17*d*1 continuous with the front end 17*a*1 is positioned slightly closer to the vehicle front than a lower end 17*d*2. The lower end 17*d*2 of the lower vertical groove 17*d* reaches the bottom surface 19 of the luggage compartment 3.

The luggage board 5 indicated by the solid line in FIG. 1 is located at the lower position shown in Part (b) of FIG. 2, i.e., in a state of being set at the bottom of the luggage compartment 3. The luggage board 5 set at the bottom of the luggage compartment 3 has its side edges in the vehicle width direction supported by multiple supporting protrusions 15*a* protruding inward in the vehicle width direction along the bottom surface 19 of the luggage compartment 3 from the sidewall 15. In this event, the guide pins 11 are positioned near the lower end 17*d*2 of the lower vertical groove 17*d*.

As described above, when the luggage board 5 is located at the lower position, i.e., positioned near the bottom surface 19 of the luggage compartment 3, more luggage can be loaded in the luggage compartment 3 in the space above the luggage board 5, as compared with the state where the luggage board 5 is in the upper position indicated by the chain double-dashed line in FIG. 1.

A rear board support 21 as a support part is provided near the vehicle rear side of the upper vertical groove 17*c* of the guide groove 17. The rear board support 21 is formed in a rack shape protruding toward the luggage compartment 3 (toward the near side of the sheet of FIG. 1) from the inner side surface of the sidewall 15 in the vehicle width direction. Also, a front board support 23 is provided below the vehicle front side of the horizontal groove 17*b*. As in the case of the rear board support 21, the front board support 23 is formed in a rack shape protruding toward the luggage compartment 3 (toward the near side of the sheet of FIG. 1) from the inner side surface of the sidewall 15 in the vehicle width direction. The front board support 23 and the rear board support 21 are disposed away from each other in the vehicle longitudinal direction, and the guide groove 17 crosses therebetween.

An upper surface 21a of the rear board support 21 and an upper surface 23a of the front board support 23 extend approximately parallel to an extending direction of the horizontal groove 17b, and are positioned approximately on the same plane as or slightly below the lower surface of the horizontal groove 17b. The luggage board 5 in the upper position is placed and supported on the upper surface 21a of the rear board support 21 and the upper surface 23a of the front board support 23. A front end 21c of the upper surface 21a (or an upper end of a front surface 21b) of the rear board support 21 is positioned preferably near an extended line of the inclined groove 17a, more preferably below an extended line of the lower surface of the inclined groove 17a.

Moreover, the front board support 23 is integrally provided with an erroneous operation restricting protrusion 23b protruding toward the inclined groove 17a positioned therebelow. A restricting surface 23b1 positioned on the vehicle rear side of the erroneous operation restricting protrusion 23b extends approximately perpendicularly to the extending direction of the inclined groove 17a.

Figure 4:
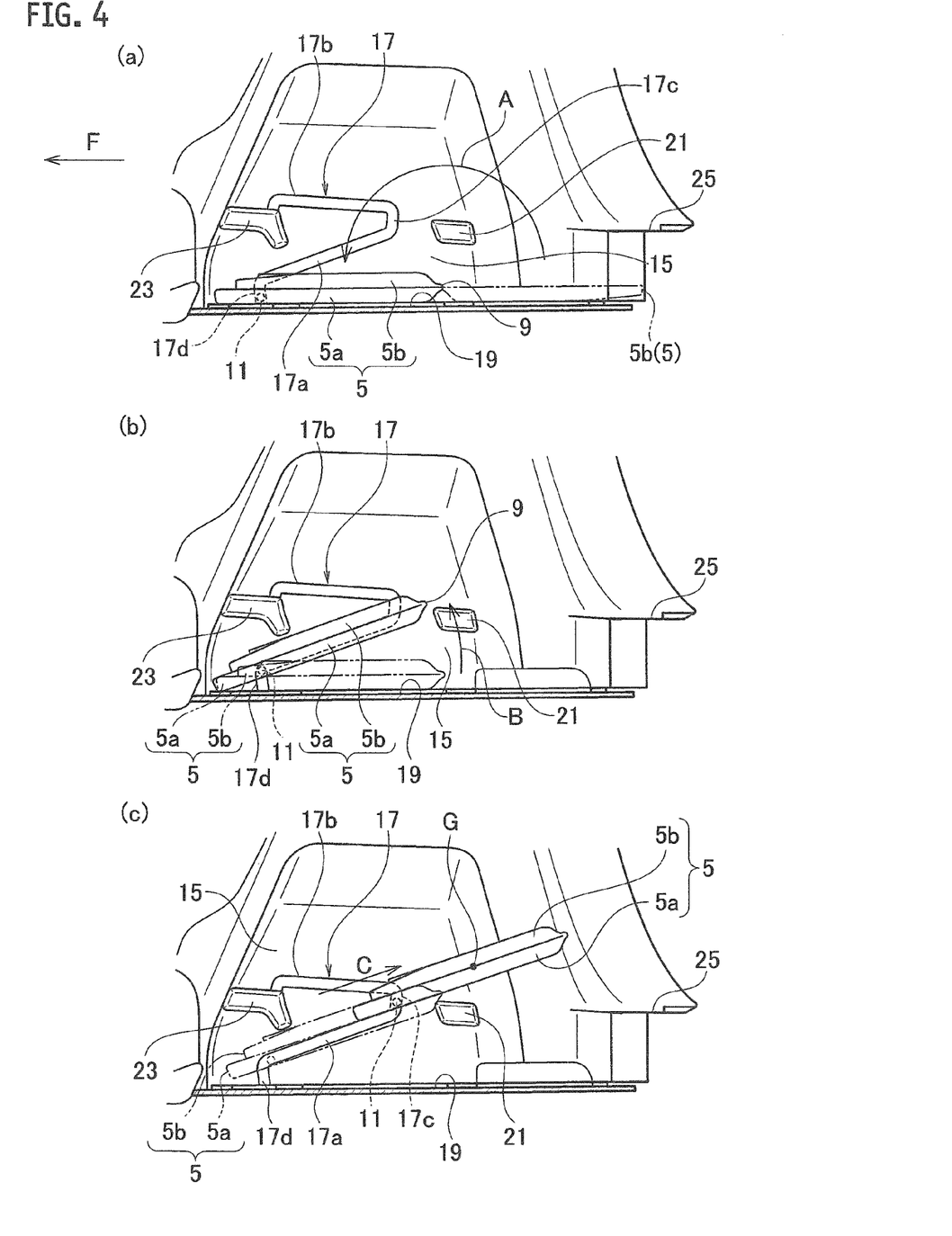
FIG. 4 is work explanatory views when the position of the luggage board is changed from the lower position to the upper position, Part (a) of FIG. 4 showing a work of folding the luggage board in the lower position, Part (b) of FIG. 4 showing a work of lifting a rear end of the folded luggage board with a front end thereof as a pivot point, and Part (c) of FIG. 4 showing a work of pulling up the luggage board toward the vehicle rear, the luggage board having the rear end lifted in the work shown in Part (b) of FIG. 4.

Next, with reference to FIGS. 4 and 5, description is given of a method of changing the position of the luggage board 5 from the lower position indicated by the solid line in FIG. 1 to the upper position indicated by the chain double-dashed line. As shown in Part (a) of FIG. 4, the user (worker) sets the luggage board 5 in the state of being folded in half in Part (b) of FIG. 3 from the open state in Part (a) of FIG. 3 while keeping the unillustrated back door of the vehicle open. In this event, the user grasps the rear end of the rear board 5b by putting his/her hand into the opening formed by the concave section 5b1 of the rear board 5b, and then rotates the rear board 5b in an arrow A direction in Part (a) of FIG. 4 about the hinge 9 while lifting up the rear end. Thereafter, the user folds the luggage board 5 forward to place the rear board 5b on the front board 5a.

Subsequently, the user rotates the luggage board 5 in an arrow B direction in Part (b) of FIG. 4 with the front end (front edge) of the luggage board 5 as a pivot point while grasping and lifting up near the hinge 9 at the rear end of the folded luggage board 5, as shown in Part (b) of FIG. 4. Then, the user inclines the luggage board 5 up to a position where the folded luggage board 5 is approximately parallel to the inclined groove 17a. During the rotation of the luggage board 5 in the arrow B direction in Part (b) of FIG. 4, the guide pins 11 move upward while being guided by the lower vertical groove 17d. During the transition of the luggage board 5 from the state of Part (a) of FIG. 4 to the state of Part (b) of FIG. 4, the guide pins 11 are guided by the lower vertical groove 17d. Thus, the movement of the luggage board 5 in the vehicle longitudinal direction is restricted until the luggage board is set approximately parallel to the inclined groove 17a. This facilitates the work of lifting up the folded luggage board 5.

Thereafter, the user moves the luggage board 5, which is inclined approximately parallel to the inclined groove 17a, to slide upward toward the rear of the vehicle (in a direction indicated by the arrow C in Part (c) of FIG. 4) along the inclined groove 17a. Meanwhile, the guide pins 11 on the luggage board 5 also move upward toward the rear of the vehicle while being guided by the inclined groove 17a. This slide movement allows the luggage board 5 to move to a position above the rear board support 21. As a result, the lower surface of the luggage board 5 is set in a state of coming almost in contact with the upper part of the rear board support 21.

When the slide movement described above allows the guide pins 11 on the luggage board 5 to reach the rear end 17a2 (see FIG. 1) of the inclined groove 17a, the center of gravity G of the luggage board 5 is positioned closer to the vehicle rear side than the rear board support 21, as indicated by the solid line in Part (c) of FIG. 4. Therefore, when the user reduces the force to support the luggage board 5, the luggage board 5 rotates in an arrow D direction in Part (a) of FIG. 5 with the rear board support 21 as a pivot point while being supported by the rear board support 21 and moving the vehicle rear side downward under its own weight. As described above, when the luggage board 5 is moved to slide to the position shown in Part (c) of FIG. 4, the center of gravity G of the luggage board 5 is positioned closer to the vehicle rear side than the rear board support 21. Thus, the luggage board 5 can be easily rotated while being supported by the rear board support 21. Note that the center of gravity G of the luggage board 5 may be positioned closer to the vehicle rear side than a point (e.g., the front end 21c of the upper surface 21a of the rear board support 21) where the lower surface of the luggage board 5 and the rear board support 21 come into contact with each other when the guide pins 11 on the luggage board 5 reach the rear end 17a2 of the inclined groove 17a.

When the luggage board 5 rotates under its own weight with the rear board support 21 as the pivot point as described above, the guide pins 11 move upward along the upper vertical groove 17c and then reach a position corresponding to the rear end 17b2 (see FIG. 1) of the horizontal groove 17b. In this state, the lower surface of approximately the center portion of the luggage board 5 in the vehicle longitudinal direction (the lower surface of the front board 5a) is placed on the upper surface 21a of the rear board support 21 as shown in Part (a) of FIG. 5.

Figure 5:
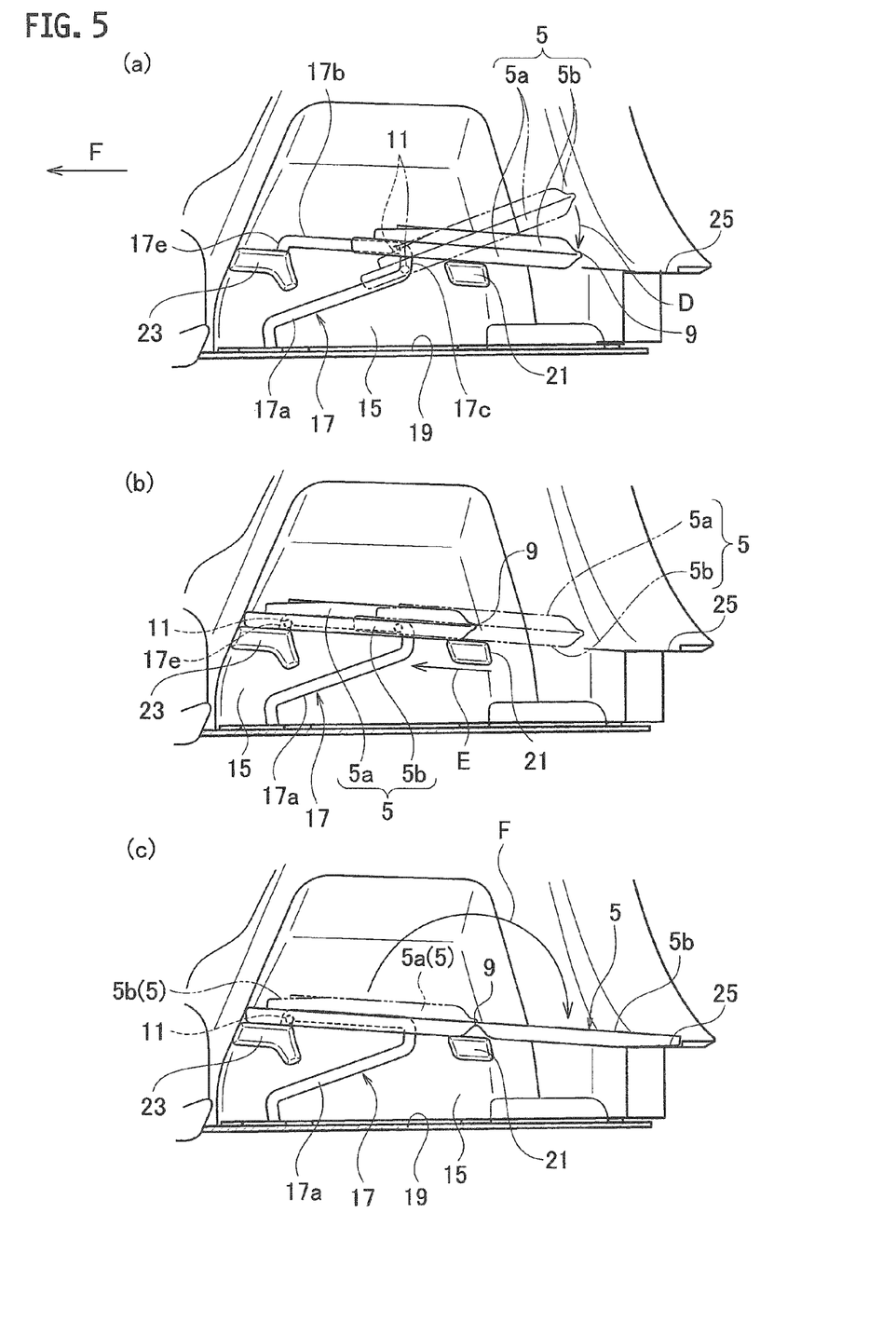
FIG. 5 is work explanatory views, subsequent to FIG. 4, when the position of the luggage board is changed from the lower position to the upper position, Part (a) of FIG. 5 showing a work of moving the rear end of the luggage board downward, the luggage board being pulled up toward the vehicle rear in the work shown in Part (c) of FIG. 4, Part (b) of FIG. 5 showing a work of moving the luggage board forward, the luggage board having the rear end moved downward in the work shown in Part (a) of FIG. 5, and Part (c) of FIG. 5 showing a work of setting the folded luggage board in the upper position in the open state, the luggage board being moved forward in the work shown in Part (b) of FIG. 5.

Next, the user moves the luggage board 5 to slide toward the front of the vehicle (in a direction indicated by the arrow E in Part (b) of FIG. 5) from the position of Part (a) of FIG. 5 while moving the guide pins 11 along the horizontal groove 17b. After this slide movement, the folded luggage board 5 reaches a vehicle front position indicated by the solid line in Part (b) of FIG. 5. Accordingly, the rear end including the hinge 9 is supported by the rear board support 21, while the front end is supported by the front board support 23. Also, in this event, the guide pins 11 partially enter into a positioning groove 17e extending downward to be continuous with the front end of the horizontal groove 17b (e.g., in the cross-section perpendicular to the vehicle width direction, half of the guide pins 11 enter into a region below the lower surface of the horizontal groove 17b inside the positioning groove 17e). Thus, the luggage board 5 is positioned in the vehicle longitudinal direction, and a click feeling during setup (operation) is achieved, improving operability.

Lastly, the user opens the folded luggage board 5 in the vehicle front position. To be more specific, the user rotates the rear board 5b in an arrow F direction in Part (c) of FIG. 5 about the hinge 9 while grasping and pulling up the strap 13 (see Part (b) of FIG. 3) provided on the rear board 5b. When the luggage board 5 is set in the open state, the vehicle rear end edge of the rear board 5b is supported by a rack-shaped rear support part 25 provided on a wall part on the vehicle rear side in the luggage compartment 3. A portion supporting the rear end of the luggage board 5 in Part (c) of FIG. 5 corresponds to the rear support part 25 near the center in the vehicle width direction.

Note that the luggage board 5 in the upper position in Part (c) of FIG. 5 may have the vehicle front side supported by the lower surface of the horizontal groove 17b through the guide pins 11 rather than by the front board support 23.

The luggage board 5 in the upper position as shown in Part (c) of FIG. 5 described above accommodates the case where not much luggage is loaded in the luggage compartment 3 in the space above the luggage board 5, as compared with the state where the luggage board is in the lower position described above. In this event, the upper surface of the luggage board 5 is approximately on the same plane as the upper surface of the lower end 7a of the rear opening 7 shown in FIG. 2. This allows luggage to be easily taken in and out on the luggage board 5 in the luggage compartment 3.

Next, description is given of a method of the work of changing the position of the luggage board 5 from the upper position shown in Part (c) of FIG. 5 to the lower position shown in Part (a) of FIG. 4. In this case, a reverse work to that of changing the position of the luggage board from the lower position to the upper position described above may be performed.

The user changes the state of the luggage board 5 in the upper position from the open state in Part (c) of FIG. 5 to the folded state in Part (b) of FIG. 5. In this event, the user grasps the rear end of the rear board 5b by putting his/her hand into the opening formed by the concave section 5b1 of the rear board 5b, and then rotates the rear board 5b in a direction opposite to the arrow F (in a counterclockwise direction in Part (c) of FIG. 5) about the hinge 9 while lifting up the rear end. Thereafter, the user folds the luggage board 5 by folding the rear board 5b forward to place the rear board 5b on the front board 5a.

Subsequently, the user moves the luggage board 5 to the position indicated by the solid line in Part (a) of FIG. 5 by grasping near the hinge 9 at the rear end of the folded luggage board 5 and pulling near the hinge 9 toward the rear of the vehicle (in a direction opposite to the arrow E in Part (b) of FIG. 5). Then, when the guide pins 11 move along the horizontal groove 17b and reach near the rear end 17b2 of the horizontal groove 17b (the state of Part (a) of FIG. 5), the lower surface of approximately the center of the front board 5a in the vehicle longitudinal direction comes into contact with the upper surface 21 of the rear board support 21. Note that, when the luggage board 5 is in the vehicle front position shown in Part (b) of FIG. 5, no large force is required to move the luggage board 5 from the vehicle front position, since the guide pins 11 only partially enter into the positioning groove 17e. Moreover, when the guide pins 11 are formed in a cylindrical shape, the luggage board 5 can be moved with a much smaller pulling force.

Then, the user rotates the luggage board 5 (more precisely, the luggage board 5 in such position that the guide pins 11 are located at positions corresponding to the upper end 17c2 of the upper vertical groove 17c) in the position indicated by the solid line in Part (a) of FIG. 5 in a direction opposite to the arrow D in Part (a) of FIG. 5 (in the counterclockwise direction in Part (a) of FIG. 5). To be more specific, the user rotates the luggage board 5 in the direction opposite to the arrow D in Part (a) of FIG. 5 with the rear board support 21 as a pivot point while grasping and lifting up near the hinge 9 of the folded luggage board 5. During the rotation of the luggage board 5, the guide pins 11 move downward while being guided by the upper vertical groove 17c.

Thereafter, the user inclines the folded luggage board 5 up to a position (substantially to the position shown in Part (c) of FIG. 4) where the luggage board 5 is approximately parallel to the inclined groove 17a by lifting the rear end of the luggage board 5. Then, when the guide pins 11 reach the lower end 17c1 of the upper vertical groove 17c, the user pushes down the luggage board 5 toward the lower front (in a direction opposite to the arrow C in Part (c) of FIG. 4). This work allows the guide pins 11 to move along the inclined groove 17a and reach the front end 17a1. Thereafter, the guide pins 11 moves downward along the lower vertical groove 17d and reaches near the lower end 17d2.

Here, it is conceivable that the user erroneously performs the work of pushing down the luggage board 5 toward the lower front before the guide pins 11 reach the upper vertical groove 17c from the horizontal groove 17b (in a state where the guide pins 11 remain in the horizontal groove 17b).

In such a case, the guide pins 11 return to the front along the horizontal groove 17b without passing through the inclined groove 17a. Meanwhile, the luggage board 5 maintains its position approximately parallel to the inclined groove 17a since the luggage board 5 is subjected to the force of pushing down the luggage board toward the lower front by the user. More specifically, when the user tries to push down the luggage board 5 toward the lower front in this state, the luggage board 5 is guided by the horizontal groove 17b to move parallel forward while maintaining the inclined position. Then, the front end thereof comes into contact with the restricting surface 23b1 of the erroneous operation restricting protrusion 23b provided on the front board support 23.

This contact restricts further forward movement of the luggage board 5 and enables determination that the user is performing an erroneous operation (work). Thus, the erroneous operation (work) can be immediately stopped. When no erroneous operation restricting protrusion 23b is provided, there is a possibility that the luggage board 5 is pushed in until the guide pins 11 reach the front end 17b1 of the horizontal groove 17b. In such a case, the front end of the luggage board 5 is inserted below the front board support 23, complicating a work of restoring the normal state.

Moreover, the erroneous operation restricting protrusion 23b is also effective for erroneous work in moving the luggage board 5 forward from the position shown in Part (a) of FIG. 5 to the position shown in Part (b) of FIG. 5 when changing the position of the luggage board 5 from the lower position to the upper position. More specifically, when the user erroneously lifts up and inclines the rear end of the luggage board after the luggage board 5 is moved forward from the state of Part (a) of FIG. 5 and the guide pins 11 start to move along the horizontal groove 17b, the front end of the luggage board 5 comes into contact with the restricting surface 23b1 of the erroneous operation restricting protrusion 23b, thus restricting further movement.

As described above, according to this embodiment, when the guide pins 11 move between the inclined groove 17a and the horizontal groove 17b during positional shift of the luggage board 5 between the lower and upper positions, the rear board support 21 on the sidewall 15 of the luggage compartment 3 serves as the pivot point to support the rotation (swing) of the luggage board 5.

Thus, without requiring a movable mechanism such as the valve member described in Japanese Patent Application Publication No. 2010-991, the luggage board 5 can be shifted between the upper and lower positions and the luggage compartment 3 of the vehicle can be divided into upper and lower parts with a more simplified structure.

Also, according to this embodiment, the guide pins 11 are positioned closer to the vehicle rear side than the front edge of the luggage board 5. Moreover, the lower vertical groove 17d extended continuously downward from the vehicle front side of the inclined groove 17a and configured to movably guide the guide pins 11 is provided on the sidewall 15 of the luggage compartment 3.

Accordingly, when the folded luggage board 5 has its rear end lifted up to be set in the state of Part (b) of FIG. 4 from the state of Part (a) of FIG. 4, the guide pins 11 are guided by the lower vertical groove 17d. Thus, back-and-forth movement of the luggage board 5 is restricted by the lower vertical groove 17d. This facilitates the work of lifting up the rear end of the luggage board 5.

Moreover, according to this embodiment, the upper vertical groove 17c is provided in an intersection part on the vehicle rear side between the inclined groove 17a and the horizontal, groove 17b. The upper vertical groove 17c is provided in the sidewall 15 of the luggage compartment 3, and enables movement of the guide pins 11 during vertical swing of the luggage board 5 with the rear board support 21 as the pivot point. Accordingly, the guide pins 11 easily and smoothly move through the upper vertical groove 17c between the inclined groove 17a and the horizontal groove 17b, thereby improving work efficiency.

Furthermore, according to this embodiment, the luggage board 5 has a structure that can be folded in the vehicle longitudinal direction. Thus, when changing the position of the luggage board 5 between the upper and lower positions by moving the luggage board along the guide groove 17, the luggage board 5 can be set in a folded compact state. Thus, workability and handleability are improved.

The foldable structure eliminates the need to form a cutout part in either side edge of the luggage board 5 in the vehicle width direction, the cutout part serving as a clearance to prevent interference with the rear board support 21, when the rear end of the luggage board 5 is vertically moved while rotating the luggage board 5 with the front end thereof as the pivot point between the states of Parts (a) and (b) of FIG. 4. Thus, the overall structure is simplified. On the other hand, a luggage board having a structure that is not foldable requires formation of the cutout part in either side edge of the luggage board in the vehicle width direction, the cutout part serving as a clearance to prevent interference with the rear board support 21, when the rear end of the luggage board is vertically moved while rotating the luggage board with the front end thereof as the pivot point between the states of Parts (a) and (b) of FIG. 4.

Furthermore, according to this embodiment, the luggage board 5 is provided with the strap 13 that can be grasped when changing the state of the luggage board 5 from the folded state to the open state. Thus, the user can change the state of the luggage board 5 from the folded state to the open state by grasping the strap 13. As a result, the workability in opening the luggage board 5 is improved.

Although the embodiments of the present invention have been described above, these embodiments are merely examples described to facilitate the understanding of the present invention and the present invention is not limited to the embodiments. The technical scope of the present invention is not limited to specific technical matters disclosed in the embodiments described above, and includes various modifications, changes, alternative techniques, and the like which can be easily derived therefrom.

This application claims the benefit of priority from Japanese Patent Application No. 2012-032929 filed on Feb. 17, 2012, the entire contents of which are incorporated herein by reference.

INDUSTRIAL APPLICABILITY

According to the present invention, when the guide pins 11 move between the inclined groove 17a and the horizontal groove 17b during positional shift of the luggage board 5 between the lower and upper positions, the rear board support 21 provided on the sidewall 15 of the luggage compartment 3 serves as the pivot point to support the rotation (swing) of the luggage board 5. Thus, a movement mechanism for a luggage board capable of dividing the vehicle luggage compartment into upper and lower parts can be provided, the movement mechanism having a more simplified structure and allowing the luggage board to be shifted between the upper and lower positions with a simple operation.

REFERENCE SIGNS LIST 3 vehicle luggage compartment
5 luggage board
11 guide pin (guide protrusion)
13 strap (grasping portion)
15 luggage compartment sidewall
17 guide groove (guide part)
17a inclined groove (lower guide section)
17b horizontal groove (upper guide section)
17c upper vertical groove (upper communicating section)
17d lower vertical groove (lower end guide section)
21 rear board support (support part that supports luggage board)

The invention claimed is:

1. A luggage board movement mechanism comprising:
a luggage board movable between an upper position and a lower position inside a vehicle luggage compartment and configured to divide the luggage compartment into upper and lower parts;
guide protrusions protruding laterally in a vehicle width direction from both side edges in the vehicle width direction on a vehicle front side of the luggage board;
a guide part provided on each of sidewalls positioned on either side of the luggage compartment in the vehicle width direction, and configured to guide the guide protrusions when the luggage board moves between the upper and lower positions; and
a support part provided on the sidewall of the luggage compartment and configured to support the luggage board, wherein
the guide part includes
a lower guide section inclined such that a vehicle rear side thereof is positioned above a vehicle front side thereof, and
an upper guide section extending toward the front of the vehicle from the end of the lower guide section on the vehicle rear side,
the support part is provided on each sidewall of the luggage compartment more toward the rear of the vehicle than an intersection part between the lower guide section and the upper guide section on the vehicle rear side,
an upper communicating section allowing movement of the guide protrusions during vertical swing of the luggage board with the support part as a pivot point is provided in the intersection part.

2. The luggage board movement mechanism according to claim 1, wherein
the guide protrusions are positioned closer to the vehicle rear side than the front edge of the luggage board, and
a lower end guide section is provided on the sidewall of the luggage compartment, the lower end guide section being extended continuously downward from the vehicle front side of the lower guide section and configured to guide the guide protrusions.

3. The luggage board movement mechanism according to claim 1, wherein the luggage board has a structure that can be folded in the vehicle longitudinal direction.

4. The luggage board movement mechanism according to claim 1, wherein the luggage board is provided with a grasping portion to be grasped when the state of the luggage board is changed from a folded state to an open state.

5. The luggage board movement mechanism according to claim 2, wherein the luggage board has a structure that can be folded in the vehicle longitudinal direction.

6. The luggage board movement mechanism according to claim 2, wherein the luggage board is provided with a grasping portion to be grasped when the state of the luggage board is changed from a folded state to an open state.

7. The luggage board movement mechanism according to claim 3, wherein the luggage board is provided with a grasping portion to be grasped when the state of the luggage board is changed from a folded state to an open state.

8. The luggage board movement mechanism according to claim 5, wherein the luggage board is provided with a grasping portion to be grasped when the state of the luggage board is changed from a folded state to an open state.

\* \* \* \* \*